(12) United States Patent
Numata

(10) Patent No.: US 11,843,890 B2
(45) Date of Patent: Dec. 12, 2023

(54) PHOTOELECTRIC CONVERSION DEVICE, IMAGE PICKUP APPARATUS, CONTROL METHOD, AND STORAGE MEDIUM

(71) Applicant: CANON KABUSHIKI KAISHA, Tokyo (JP)

(72) Inventor: Aihiko Numata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/885,658

(22) Filed: Aug. 11, 2022

(65) Prior Publication Data

US 2023/0065051 A1 Mar. 2, 2023

(30) Foreign Application Priority Data

Aug. 26, 2021 (JP) ................. 2021-138338

(51) Int. Cl.
| | |
|---|---|
| H04N 25/77 | (2023.01) |
| H04N 25/42 | (2023.01) |
| H04N 25/74 | (2023.01) |
| H04N 25/773 | (2023.01) |
| H04N 25/707 | (2023.01) |
| H04N 25/47 | (2023.01) |
| G01T 1/24 | (2006.01) |
| H01L 31/107 | (2006.01) |

(52) U.S. Cl.
CPC ............ H04N 25/77 (2023.01); H04N 25/42 (2023.01); H04N 25/74 (2023.01)

(58) Field of Classification Search
CPC ........ H04N 25/77; H04N 25/74; H04N 25/42; H04N 25/773; H04N 25/707; H04N 25/47; H01L 29/0626; H01L 29/66113; H01L 29/713; H01L 31/107; G01T 1/248
See application file for complete search history.

(56) References Cited

U.S. PATENT DOCUMENTS

| | | | | |
|---|---|---|---|---|
| 9,121,766 | B2* | 9/2015 | Mazzillo | G01J 1/46 |
| 9,178,100 | B2* | 11/2015 | Webster | H01L 31/107 |
| 9,210,350 | B2* | 12/2015 | Dai | H04N 25/533 |
| 11,233,966 | B1* | 1/2022 | Niclass | G01S 7/48 |
| 11,290,675 | B2* | 3/2022 | Hirose | H04N 25/77 |
| 11,297,269 | B2* | 4/2022 | Yasuda | H04N 25/778 |
| 11,533,445 | B2* | 12/2022 | Nishino | H04N 25/77 |

(Continued)

FOREIGN PATENT DOCUMENTS

JP 2002-3273 A 7/2003

Primary Examiner — Marly S Camargo
(74) Attorney, Agent, or Firm — Cowan, Liebowitz & Latman, P.C.

(57) ABSTRACT

In order to achieve a photoelectric conversion device that enables suppressing the lowering in tone, a photoelectric conversion device has a pixel including a photoelectric conversion element that outputs a signal according to an incident photon; a photon counter that outputs a measured value according to the number of photons incident to the pixel, a time counter that measures a time until the measured value of the photon counter reaches a first threshold after the photon counter starts the measurement, and a sensitivity adjustment unit configured to perform a sensitivity change for the pixel during a time until the measured value of the photon counter reaches the first threshold after the photon counter starts the measurement.

15 Claims, 8 Drawing Sheets

(56) References Cited

U.S. PATENT DOCUMENTS

| | | |
|---|---|---|
| 2015/0163429 A1 | 6/2015 | Dai |
| 2017/0030769 A1* | 2/2017 | Clemens .................... G01J 1/46 |
| 2020/0278429 A1* | 9/2020 | Mandai ..................... G01J 1/44 |
| 2023/0109506 A1* | 4/2023 | Igarashi ................. H04N 25/62 |
| 2023/0247307 A1* | 8/2023 | Numata ................. H04N 25/77 |

* cited by examiner

PHOTOELECTRIC CONVERSION DEVICE, IMAGE PICKUP APPARATUS, CONTROL METHOD, AND STORAGE MEDIUM

BACKGROUND OF THE INVENTION

Field of the Invention

The present invention relates to a photoelectric conversion device, provided with a photoelectric conversion element that outputs signals according to incident photons, an image pickup apparatus, a control method, a storage medium, and the like.

Description of the Related Art

In recent years, a photoelectric conversion device that digitally counts the number of photons that are incident to an avalanche photodiode and outputs the counted value from a pixel to serve as a photoelectrically converted digital signal has been developed.

In U.S. Patent Publication No. 2015/0163429, a configuration in which a time counter for measuring time is provided, in addition to a photon counter that counts photons. The time counter measures a time until the number of the photons reaches a predetermined value after the photon counter starts measurement, and calculates a pixel value based on the measured time. Since the time for measuring photons is different for each pixel, an image in which the dynamic range is high can be acquired.

However, in the configuration of U.S. Patent Publication 2015/0163429, if the luminance of an object is high, time until the number of photons reaches a predetermined value becomes short, the tone when the pixel value is calculated becomes coarse

SUMMARY OF THE INVENTION

It is an object of the present invention to provide a photoelectric conversion device and the like that enables suppressing the reduction in gradation.

A photoelectric conversion device that enables suppressing the decrease in tone, photoelectric conversion device has at least one pixel including a photoelectric conversion element that outputs a signal according to an incident photon, a photon counter that outputs a measured value according to the number of photons incident to the pixel, a time counter that measures a time until the measured value of the photon counter reaches a first threshold after the photon counter starts the measurement, and at least one processor or circuit configured to function as:

a sensitivity adjustment unit configured to perform a sensitivity change for the pixel during a time until the measured value of the photon counter reaches the first threshold after the photon counter starts the measurement.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
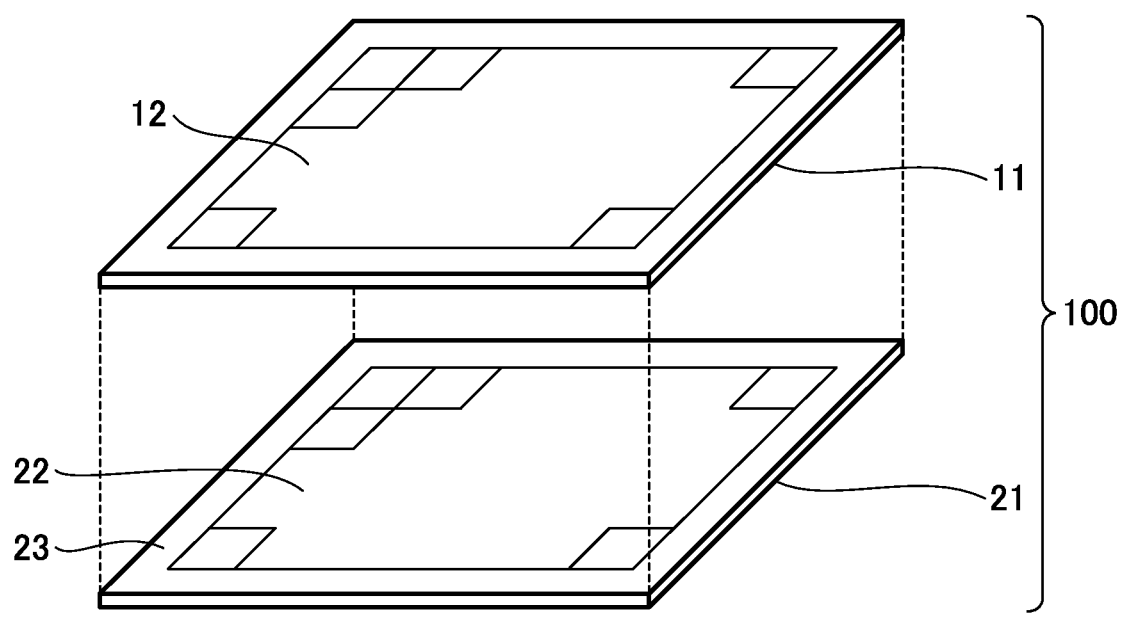
FIG. 1 explains a configuration of a photoelectric conversion device according to the first embodiment.

FIG. 1 explains an example of a configuration of a photoelectric conversion device according to the first embodiment. The photoelectric conversion device 100 is configured by laminating and electrically connecting two chips of a sensor chip 11 and a circuit chip 21. The sensor chip 11 includes a pixel region 12. The circuit chip 21 includes a pixel circuit region 22 for processing signals detected by each pixel of the pixel region 12 in parallel, and a peripheral circuit region 23 for controlling the readout of signals from the pixel circuit region 22 and the operation of the pixel circuit region 22.

Figure 2:
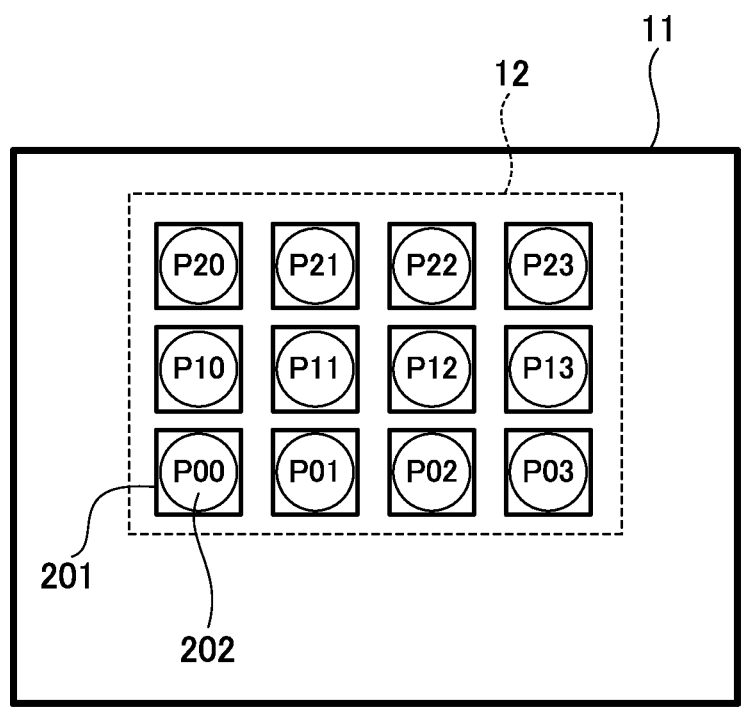
FIG. 2 explains an example of a configuration of a sensor chip according to the first embodiment.

FIG. 2 explains an example of a configuration of the sensor chip 11 according to the first embodiment. The pixel region 12 of the sensor chip 11 includes a plurality of pixels 201 that are two-dimensionally arranged. That is, the pixel region 12 includes the pixels 201, and the pixels are arranged in a plurality of rows and a plurality of columns. Each of the pixels 201 includes a photoelectric conversion element 202 including an avalanche photodiode (hereinafter, referred to as "APD") that outputs a signal according to the incident photons.

FIG. 2 illustrates 12 pixels 201, which are arranged in three rows from the 0th row to the second row and in four columns from the 0th column to the third column, are shown with reference numerals that indicate the row number and the column number. For example, the pixel 201 being arranged in the second row and the second column is denoted by "P22". The number of rows and columns of the pixels 201 that configure the pixel region 12 is not limited to the example shown in FIG. 2.

Figure 3:
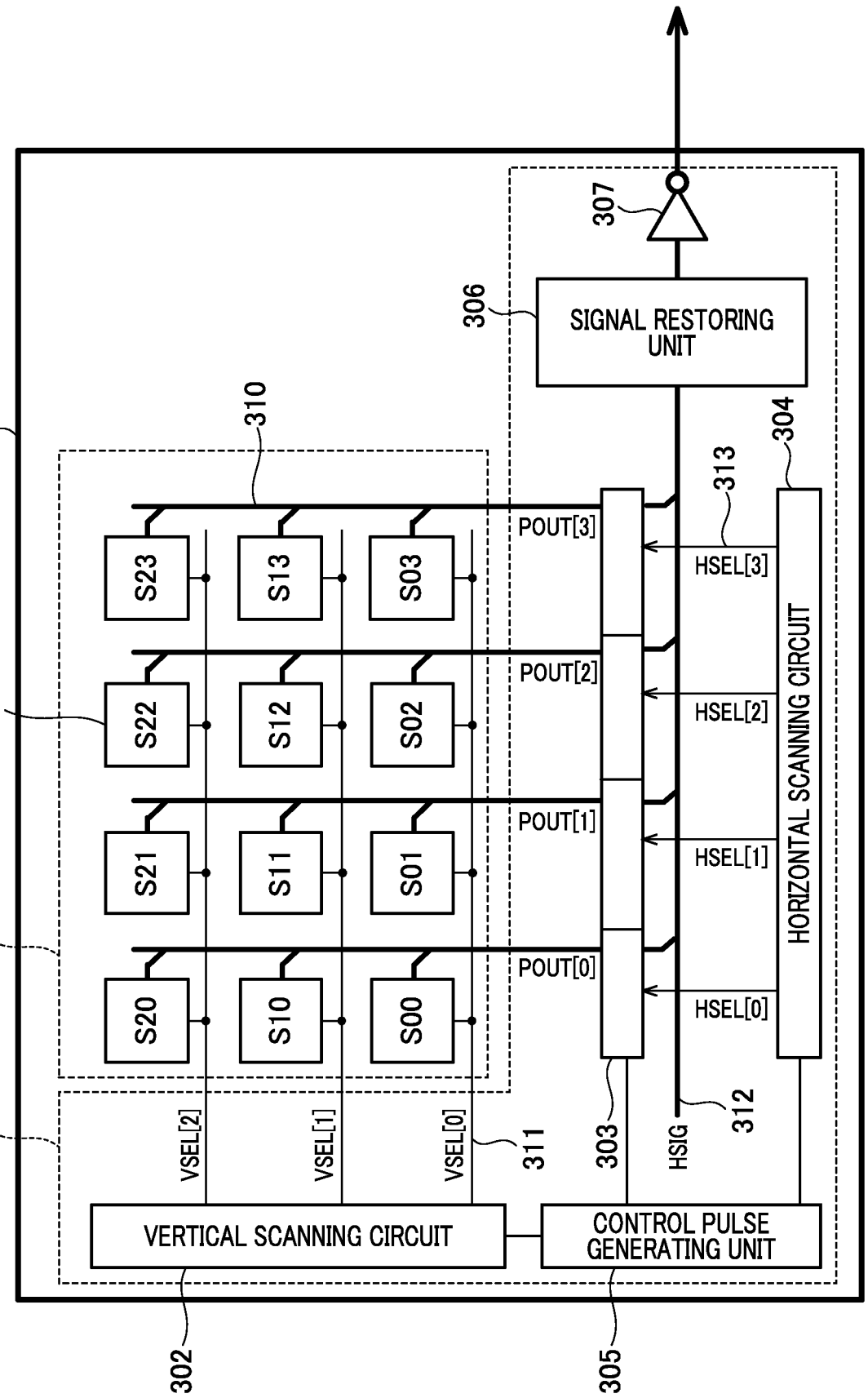
FIG. 3 is a block diagram showing an example of a configuration of a circuit chip 21 according to the first embodiment.

FIG. 3 is a block diagram showing an example of a configuration of the circuit chip 21 according to the first embodiment. The circuit chip 21 includes the pixel circuit region 22 and the peripheral circuit region 23.

The pixel circuit region 22 includes a plurality of signal processing units 301 that are two-dimensionally arranged in a plurality of rows and a plurality of columns, and each of the signal processing units 301 is electrically connected to each of the corresponding pixels 201 of the sensor chip.

FIG. 3 illustrates 12 signal processing units 301, which are arranged in three rows from the 0th row to the second row and in four columns from the 0th column to the third column, with reference numerals indicating the row number and the column number. For example, the signal processing unit 301 being arranged in the second row and the second column is denoted by "S22".

The number of rows and columns of the signal processing units 301 that configure the pixel circuit region 22 is not limited to the example in FIG. 3, the other number of the rows and columns may be used if the number of the signal processing units 301 corresponds to the number of rows and columns of the pixels 201 of the sensor chip 11. Additionally, each of the signal processing units 301 is provided with a photon counter 403 that measures the number of photons incident to the pixel and a time counter 404 that measures the time, as will be described below.

The peripheral circuit region 23 includes a vertical scanning circuit 302, a column circuit 303, a horizontal scanning circuit 304, a control pulse generating unit 305, a signal restoring unit 306, a horizontal output circuit 307, and the like. Vertical selection lines 311 are wired to the signal processing units 301 in each row in the pixel circuit region 22 in the first direction (horizontal direction in FIG. 3). The vertical selection lines 311 are shared and connected to the signal processing units 301 being arranged in the first direction. The first direction may be denoted by the "row direction" or the "horizontal direction".

In FIG. 3, the vertical selection lines 311 are shown with reference numerals that indicate row numbers. For example, the vertical selection line 311 in the first row is denoted by "VSEL [1]". The vertical selection lines 311 in each row are connected to the vertical scanning circuit 302, and the vertical scanning circuit 302 supplies vertical selection signals VSEL for selectively driving the signal processing unit 301 in a predetermined row to the signal processing unit 301 via the vertical selection lines 311.

In the present embodiment, the vertical selection lines 311 include a readout vertical selection line for reading out signals from the signal processing units 301 in each row and a resetting vertical selection line for resetting signals from the signal processing units 301 in each row.

Vertical signal lines 310 are wired to the signal processing units 301 in each column of the pixel circuit region 22 in the second direction (vertical direction in FIG. 3) orthogonal to the first direction. The vertical signal lines 310 are shared and connected to the signal processing units 301 being arranged in the second direction. The second direction may be denoted by the "column direction" or the "vertical direction".

In FIG. 3, the vertical signal lines 310 are shown with reference numerals that indicate column numbers. For example, the vertical signal line 310 in the third column is denoted by "POUT [3]". The vertical signal lines 310 in each column include n signal lines for outputting an n-bit digital signal.

The horizontal scanning circuit 304 supplies horizontal selection signals for reading out signals from the column circuit 303 to the column circuit 303 via a horizontal selection line 313. Upon receiving the horizontal selection signals from the horizontal scanning circuit 304, the column circuit 303 sequentially outputs the output signals being temporarily held to the horizontal output circuit 307 via a signal line 312 and via the signal restoring unit 306. The signal line 312 includes n signal lines for outputting an n-bit digital signal. In FIG. 3, the horizontal selection line 313 is shown with reference numerals that indicate column numbers. For example, the horizontal selection line 313 in the third column is denoted by "HSEL [3]".

The control pulse generating unit 305 supplies control pulse signals for controlling the operations of the vertical scanning circuit 302, the horizontal scanning circuit 304, and the column circuit 303 and the timing thereof. At least a part of the pulse signals for controlling the operation of the vertical scanning circuit 302, the horizontal scanning circuit 304, and the column circuit 303 and the timing thereof may be supplied from the outside of the photoelectric conversion device 100.

As will be described below, the signal restoring unit 306 calculates a pixel value based on a value of the time counter 404 and outputs the pixel value to the horizontal output circuit 307. The horizontal output circuit 307 outputs a signal corresponding to the pixel value that has been obtained by the restoration by the signal restoring unit 306 as an output signal of the photoelectric conversion device 100. The signal restoring unit 306 may be provided outside the photoelectric conversion device 100.

Figure 4:
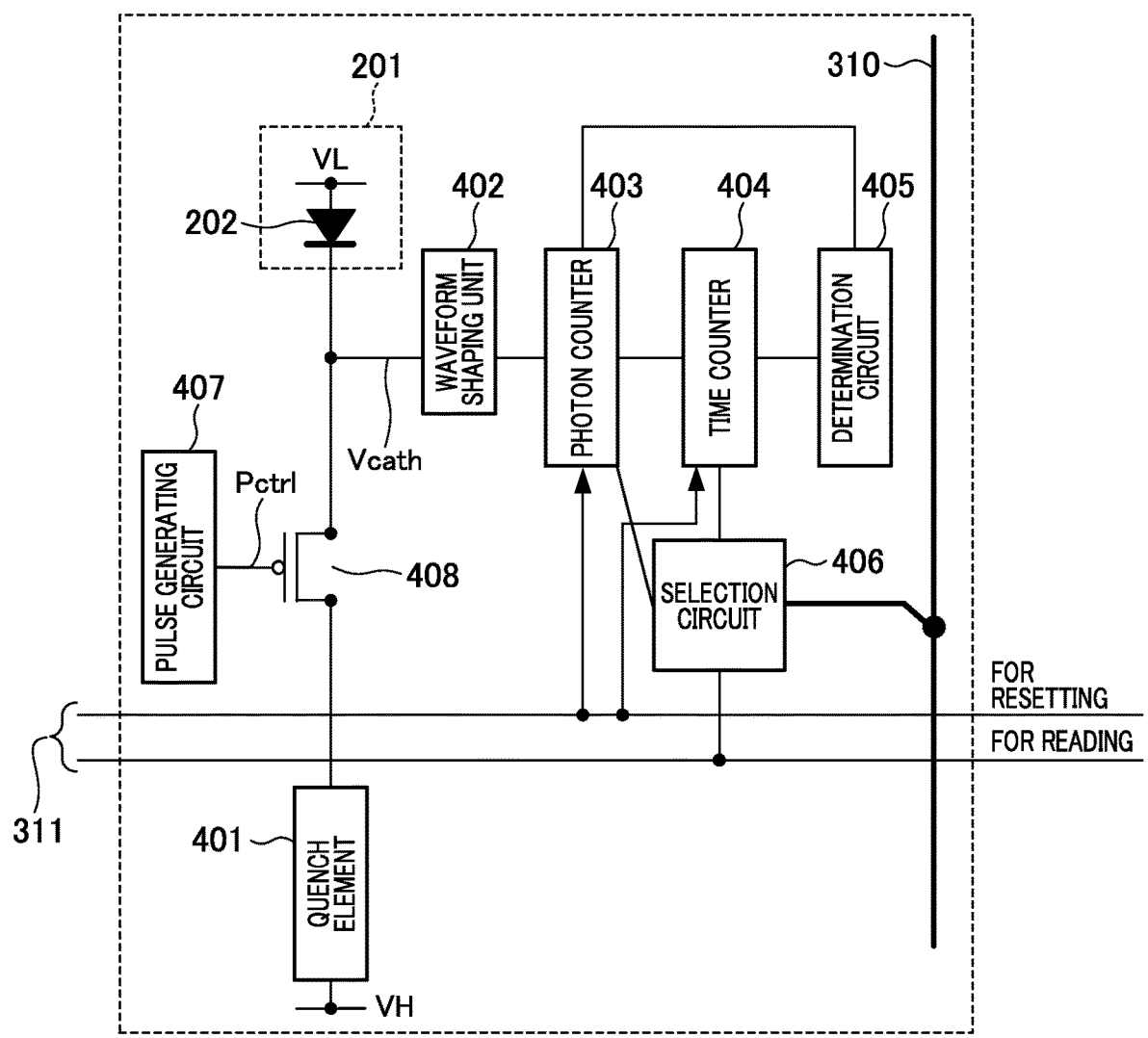
FIG. 4 is an equivalent circuit diagram of pixels 201 and signal processing units 301 according to the first embodiment.

FIG. 4 is an equivalent circuit diagram of the pixels 201 and the signal processing unit 301 according to the first embodiment. The pixel 201 in the sensor chip 11 includes an APD 202 that is a photoelectric conversion element. The other part of FIG. 4 corresponds to the signal processing unit 301 connected to the pixel 201.

When a photon is incident to the APD 202, a charge pair is generated by photoelectric conversion. A voltage VL (first voltage) is supplied to the anode of the APD 202, and a voltage VH (second voltage), which is higher than the voltage VL supplied to the anode, is supplied to the cathode of the APD through a switch element 408.

Reverse bias voltages causing the APD 202 to perform an avalanche multiplication operation are supplied to the anode and the cathode of the APD 202. In a state in which such voltages are supplied thereto, the charges generated by the incident light cause avalanche multiplication, and an avalanche current is generated.

The APD 202 has a Geiger mode in which the potential difference between the anode and the cathode is greater than the breakdown voltage, and a linear mode in which the potential difference between the anode and the cathode is close to or lower than the breakdown voltage.

The APD operated in the Geiger mode is referred to as "SPAD" (Single Photon Avalanche Diode). At this time, the voltage VL (first voltage) is set to, for example, −30V, and the voltage VH (second voltage) is set to, for example, 1V.

The signal processing unit 301 in the circuit chip 21 includes a quench element 401, a waveform shaping unit 402, the photon counter 403, a time counter 404, a determination circuit 405, a selection circuit 406, a pulse generating circuit 407, a switch element 408, and others. The pulse generating circuit 407 supplies a pulse for switching ON and OFF of the bias potential of the APD 202 by the switching element 408.

The quench element 401 is connected to a power supply that supplies the voltage VH and the APD 202 via the switch element 408. The quench element 401 has a function for replacing the change in the avalanche current caused by the APD 202 with a voltage signal. The quench element 401 functions as a load circuit (quench circuit) when the signals are multiplied due to the avalanche multiplication and has a function for controlling the voltage supplied to the APD 202 and controlling the avalanche multiplication (quench operation).

The waveform shaping unit 402 shapes the potential change of the cathode of the APD 202 obtained during photon detection and outputs pulse signals. For example, an inverter circuit and a buffer circuit are used as the waveform shaping unit 402.

Reference numeral 403 denotes a photon counter that measures the number of photons that are incident to the pixel and counts the pulse signals that have been output from the waveform shaping unit 402 up to, for example, a first threshold Cx. The photon counter 403 resets the count value when a predetermined control signal is supplied via the vertical selection line 311.

The determination circuit 405 determines whether or not the count value of the photon counter 403 has reached the first threshold Cx. The time counter 404 measures a time until determination circuit 405 determines that the count value (the measured value) of the photon counter 403 has reached a first threshold Cx after the photon counter 403 starts the measurement, and outputs the measured time as a pixel value.

That is, when the determination circuit 405 determines that the count value of the photon counter 403 has reached the first threshold Cx, the time counter 404 immediately stops counting time and stores the time count value at that time point as a pixel value.

Accordingly, this means that as the time required to reach the first threshold Cx is shorter, the amount of light incident to the pixel per unit time is higher (brighter). That is, it is possible to acquire the brightness information of each pixel as a pixel value based on the count value of the time counter 404 by measuring the time up to saturation. Details of the processing for restoring the pixel signals from the count value of the time counter 404 will be described below.

The selection circuit 406 switches the electric ON and OFF between the time counter 404 and the vertical signal lines 310 according to the vertical selection signal VSEL for reading out the n-th row supplied from the vertical scanning circuit 302 via the vertical selection line 311 in FIG. 3. When the ON state is set, the time count value is sent to the column circuit 303 via the vertical signal line 310 and is output to the outside of the photoelectric conversion device 100 via the signal restoring unit 306 and the horizontal output circuit 307.

After the time count value is read out by the selection circuit 406 based on the read-out selection signals that are supplied from the vertical selection line 311, the photon counter 403 and the time counter 404 are reset by the reset signals that are supplied via the vertical selection line 311. Each counter restarts counting immediately after resetting.

The pulse generating circuit 407 can adjust the pixel sensitivity by limiting the number of pulses counted by the photon counter 403 from among the pulse signals generated due to the avalanche multiplication.

Figure 5:
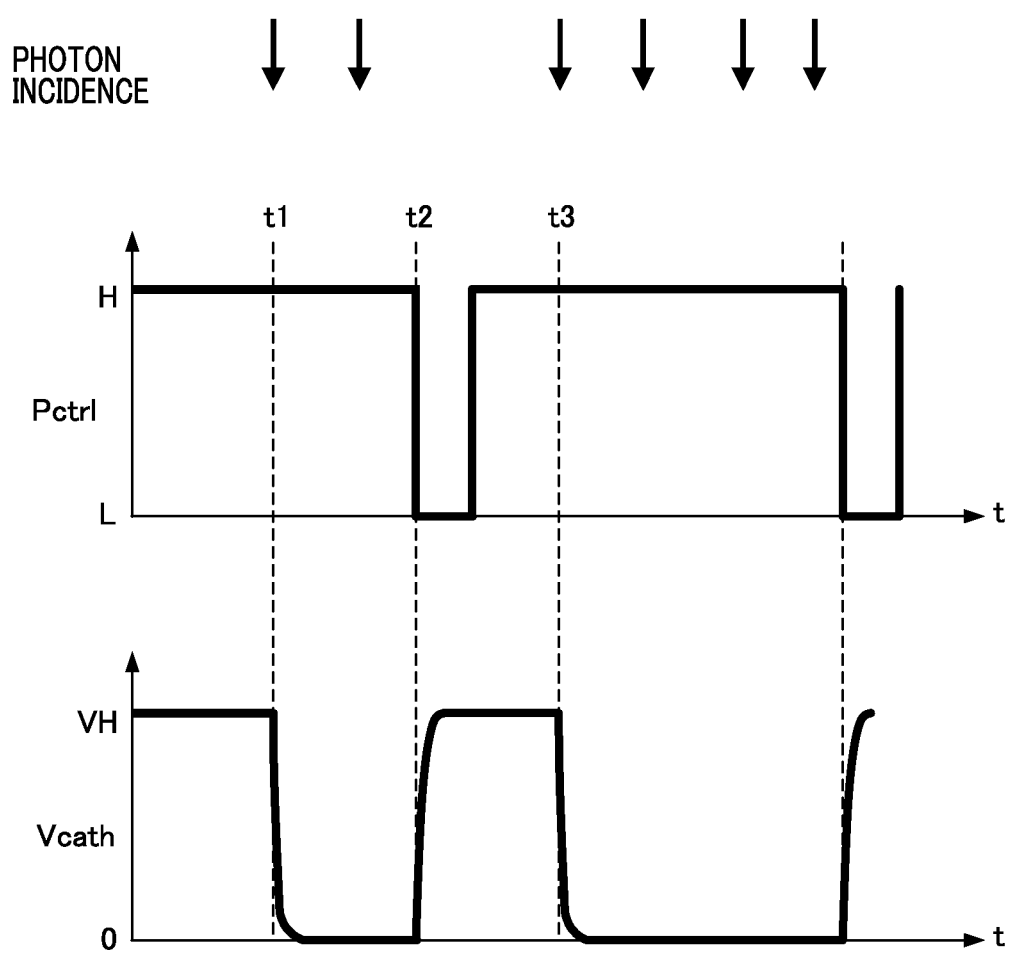
FIG. 5 illustrates a sensitivity adjustment operation by the pulse generation circuit in the first embodiment.

FIG. 5 explains the operation of the sensitivity adjustment performed by the pulse generating circuit according to the first embodiment.

Each of the signals shown in FIG. 5 corresponds to each of the signals shown in FIG. 4, where Pctrl is the gate control signal supplied from pulse generating circuit 407 to the gate of the switch element 408, and Vcath is the cathode voltage of the switch element 408, which serves as an input of the waveform shaping unit 402. The timing when the photon is incident is shown by arrows.

Since the gate control signal Pctrl is at the H (High) level for a period of time before the timing t1, the cathode of the APD 202 is in a floating state. Additionally, the recharging of the APD 202 has been completed, and the status is a standby state in which the avalanche multiplication is feasible.

In this state, when the photon is incident at timing t1, the avalanche multiplication occurs, the cathode voltage Vcath transitions from H to L (Low), and the count value of the photon counter 403 increases by one count via the waveform shaping unit 402.

However, since the cathode of the APD 202 remains in the floating state, recharging does not occur after counting, and the number of counts of the photon counter 403 does not change until timing t2.

At timing t2, the pulse generating circuit 407 changes the gate control signal Pctrl to the L level. Thereby, the cathode of the APD 202 is switched from the floating state to the state of connection to the VH, recharging occurs, and the APD 202 returns to the standby state in which the avalanche multiplication is feasible. Subsequently, when the photon enters at timing t3, the avalanche multiplication occurs and the count value of the photon counter 403 increases by one count via the waveform shaping unit 402.

Thus, the count value of the photon counter 403 is limited to one even if any number of photons enters within one period of the pulse of the gate control signal Pctrl from the pulse generating circuit 407. Accordingly, the count number of the photon counter 403 per unit time, in other words, the pixel sensitivity can be adjusted based on the pulse period of the gate control signal Pctrl from the pulse generating circuit 407.

That is, if the pulse period of the gate control signal Pctrl is set longer by the pulse generating circuit 407, the sensitivity can be lowered, and if the pulse period of the gate control signal Pctrl is set shorter by the pulse generating circuit 407, the sensitivity can be increased. Thus, it is possible to change the sensitivity by changing the pulse period for switching the bias potential of the APD 202.

The signal restoration unit 306 shown in FIG. 3 restores the time count value counted by the time counter 404 as output signals of the pixel that indicate the brightness information of the object. When the time until the count value reaches the first threshold Cx after counting by the photon counter 403 starts is denoted by "T", the pixel signal value C can be obtained by the following formula 1.

$$C = K/T \qquad \text{Formula 1}$$

K is a natural number and is preferably determined such that C is not less than 1 LSB. Specifically, K may be defined to be the maximum value (upper limit) of the time count value.

The photoelectric conversion device 100 of the present embodiment suppresses the lowering of gradation by controlling the pulse period of the gate control signal Pctrl output from the pulse generating circuit 407.

First, a description will be given of a drawback that occurs when the pulse period is not temporally controlled as in the photoelectric conversion device disclosed in Japanese Patent Application Laid-Open No. 2002-3273. As evident from the above Formula 1, as T is smaller, the amount of change of C when T is changed by one count more increases.

Therefore, when T is smaller, the tone of the pixel signal after restoration lowers. T is smaller when many photons are incident to the pixel per unit time, that is, when the luminance of the object is high. That is, when the luminance of the object is high, the time until the count value reaches the first threshold Cx after the photon counter 403 starts counting is shortened, so that the tone of the pixel signal after restoration lowers.

FIG. 6 is an example of the sensitivity adjustment in the first embodiment, and explains the relation between the count number of the time counter 404 and the count number of the photon counter 403.

Figure 6A:
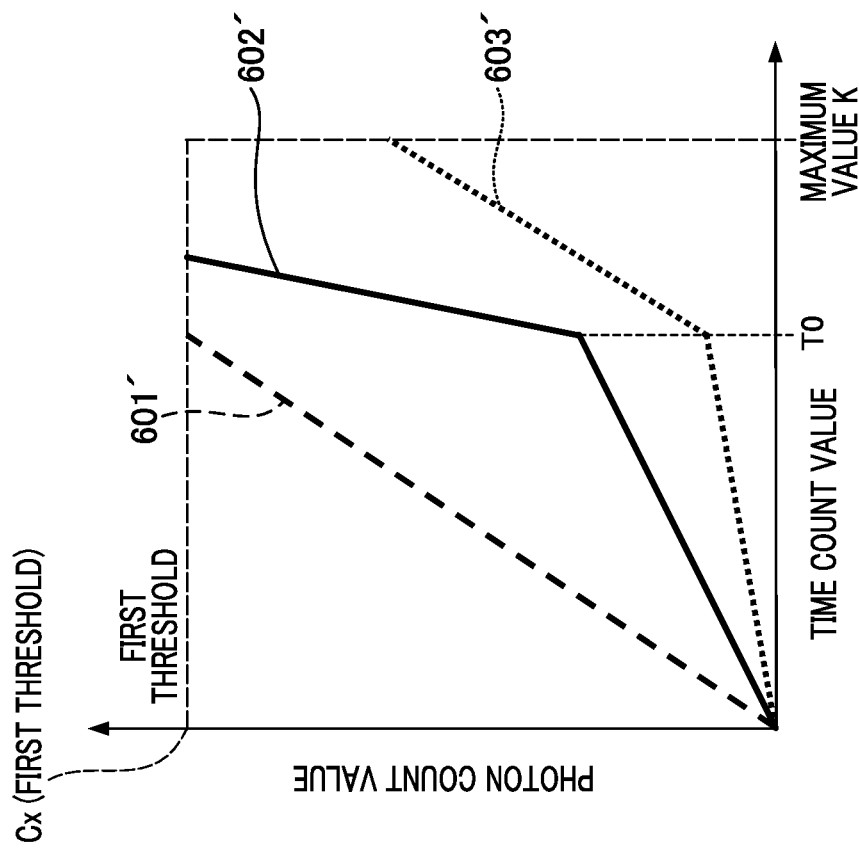
FIGS. 6A and 6B explain an example of the sensitivity adjustment in the first embodiment.
Figure 6B:
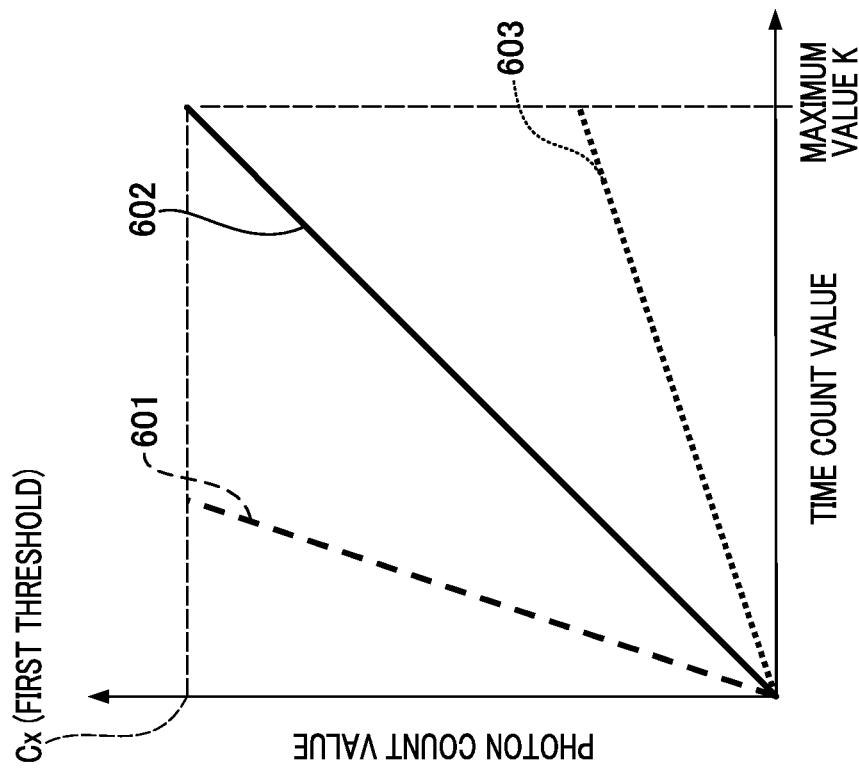

FIG. 6A explains an example of driving of a conventional photoelectric conversion device shown for comparison, and FIG. 6B illustrates an example of the sensitivity adjustment in the photoelectric conversion device according to the present embodiment. In each of the drawings, reference numeral 601 denotes a curve when the luminance of the object is high, reference numeral 602 denotes a curve when the luminance of the object is appropriate, and reference numeral 603 denotes a curve when the luminance of the object is low.

As shown by the curve 601 in FIG. 6A, when the conventional photoelectric conversion device is used and the luminance of the object is high, the time until the count value reaches the first threshold Cx after the photon counter 403 starts counting becomes shorter. Therefore, the tone of the pixel signals after restoration lowers. That is, the tone difference becomes coarse.

In contrast, in the photoelectric conversion device according to the present embodiment, the pulse period before the first timing T0 is prolonged to decrease the sensitivity. Therefore, when the luminance is high, the time until the count value reaches the first threshold Cx after the photon counter 403 starts counting becomes longer, resulting in suppressing the lowering in the tone of the pixel signals after restoration, as shown by the curve 601' in FIG. 6B.

Consequently, the accumulation time (time period for counting photons in the photoelectric converting device) in the case in which the luminance of the object is high is effectively is prolonged, so that the effect of reducing the influence of flicker of the light source can also be attained. Moreover, the effect of making the electric power more uniform can be attained since the count timing for the high-sensitivity pixels occurs later.

Additionally, the pulse generating circuit 407 shortens the pulse period that is after the first timing T0, during the time until the measured value of the photo counter reaches the first threshold Cx after the photon counter 403 starts the measurement.

Accordingly, for example, the pixel sensitivity is increased at the time count value T0 as shown by the curves 602' and 603' in FIG. 6B. The curves 601', 602' and 603' in FIG. 6B respectively correspond to the curves 601, 602 and 603 in FIG. 6A.

Thus, in the photoelectric conversion device of the present embodiment, it is possible to achieve an effect of improving the signal-to-noise ratio when the luminance of the object is low (the curve 603' in FIG. 6B) by changing the pixel sensitivity so that the sensitivity increases at the time count value T01.

That is, in comparison with the curve 603 in FIG. 6A, the curve 603' in FIG. 6B results in increasing the count value of the photon counter 403 when the count value of the time counter 404 reaches the maximum value (upper limit) K.

Thus, the pulse generating circuit 407 functions as a sensitivity adjustment unit for performing the change of pixel sensitivity at least once during the time until the measured value of the photo counter reaches the first threshold Cx after the photon counter 403 starts the measurement.

In the example of FIG. 6B, the pulse period is switched only once at the first timing T0 during the period up to the maximum value K of the time count. However, the pulse period may be switched a plurality of times during the period up to the maximum value K of the time count, or the pulse period may be continuously and gradually changed.

It is preferable that the pulse period is changed a plurality of times or continuously and gradually changed, because the temporal change in the sensitivity can be precisely controlled. Even when the sensitivity adjustment is performed a plurality of times, it is preferable that the pixel sensitivity is gradually increased temporally.

Second Embodiment

In the first embodiment, although the pulse period is switched to a fixed period that is shorter after the first timing T0, the pulse period may be changed appropriately.

That is, in the second embodiment, the pulse period after the first timing T0 is controlled, for example, according to the count value of the photon counter 403 at the first timing T0.

Figure 7:
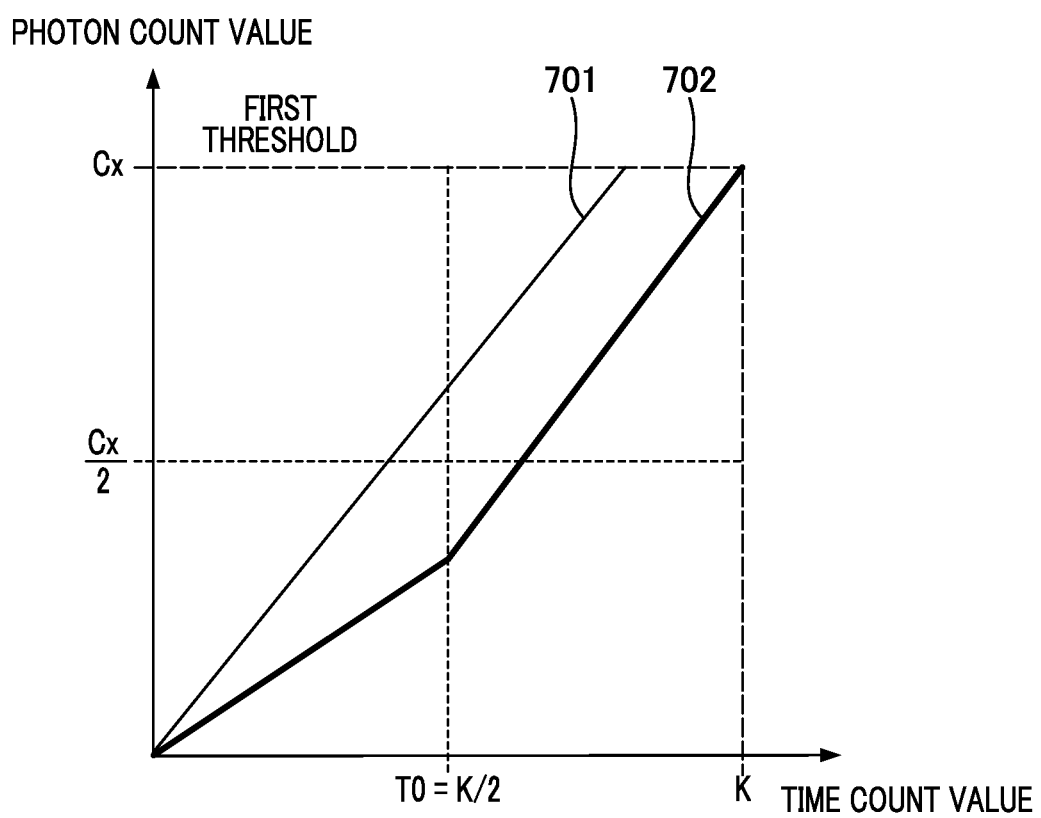
FIG. 7 explains an example of the sensitivity adjustment in the second embodiment.

FIG. 7 illustrates an example of the sensitivity adjustment in the second embodiment. In FIG. 7, at the first timing T0=K/2, whether or not the count value of the photon counter 403 is less than half of the first threshold Cx is determined.

When the count value is equal to or higher than half of the first threshold Cx (a curve 701 in FIG. 7), the pulse period is not changed. The timing of changing the sensitivity and the threshold of the count value of the photon counter 403 at that time are not limited to the above.

In contrast, at the first timing T0=K/2, when the count value is equal to or less than half of the first threshold Cx (a curve 702 in FIG. 7), the pulse period is changed so that the count value of the photon counter 403 reaches the first threshold Cx at the timing K.

That is, the sensitivity adjustment unit adaptively changes the pixel sensitivity following the first timing according to the measured value of the photon counter at the first timing.

Moreover, the pixel sensitivity following the first timing is changed so that the measured value of the photon counter reaches the first threshold Cx when the time measured by the time counter reaches the maximum value K serving as the second threshold.

Specifically, the timing at which the count value of the photon counter 403 reaches the first threshold Cx can be brought closer to the maximum value K of the time count, and the count value of the photon counter 403 at the time of reaching the maximum value K of the time count can be brought closer to the first threshold Cx. As a result, the effect of improving tone and improving the signal-to-noise ratio is achieved.

Also in the example of FIG. 7, changing the pulse period a plurality of times may be performed before the time measured by the time counter reaches the maximum value K serving as the second threshold. Changing the pulse period a plurality of times is preferable because the tone further improves and the SN ratio further improves.

It is desirable that the timing for changing the sensitivity is K/(2 to the Nth power), and the pulse period is 1/(2 to the Nth power), where N is an integer.

Additionally, for example, whether or not the count value of the photon counter 403 in all pixels or a predetermined region reaches a predetermined threshold may be determined before changing the sensitivity for the first time. Additionally, it is desirable that the number of pixels to be referred to for determination is gradually reduced before changing the sensitivity for the second time, for example, determining whether or not the count value of the photon counter 403 in the pixel, which is equal to or higher than the predetermined count value for the first time, reaches a predetermined threshold.

In the case in which the sensitivity is changed at a plurality of times, the sensitivity may not be changed every time or to be decreased at some time, instead of increasing the sensitivity every time, depending on the case. Additionally, for example, the sensitivity may be gradually decreased so that the dynamic range is expanded.

In the above example, although the pulse period of the pulse generating circuit is used, which serves as the sensitivity adjustment unit that performs the pixel sensitivity adjustment, pixel sensitivity adjustment may be performed by using another sensitivity adjustment unit. For example, an ND filter for which a liquid crystal or an electrochromic material is used may be provided on the light incident side such that the transmittance of the ND filter is changed to increase temporally, or an ND filter that has a mechanically high density may be switched to an ND filter that has a mechanically low density.

Alternatively, a diaphragm may be provided in an imaging optical system so that the aperture of the diaphragm is gradually increased for changing the pixel sensitivity temporally. Additionally, control may be performed by using any one of these sensitivity adjustment units so that the sensitivity increases at some point, or control may be performed by combining a plurality of these sensitivity adjustment units so that a sensitivity adjustment step for increasing the sensitivity at some point is executed.

Note that the pixel sensitivity may be changed temporally for each pixel, may be uniformly and temporally changed in all pixels, or may be changed for each pixel region including a predetermined plurality of pixels (for example, two pixels in the vertical direction×two pixels in the horizontal direction).

For example, when color filters are arranged in the order of RGRG in the pixels of a predetermined row of the photoelectric conversion device, and Bayer array color filters in which color filters are arranged in the order of GBGB are arranged in the pixels of the following row, the pixel region (two pixels in the vertical direction×two pixels in the horizontal direction) are four pixels of R, G, B and G.

In that case, the sensitivity adjustment unit temporally changes the pixel sensitivity for each predetermined pixel region including the pixels (two pixels in the vertical direction×two pixels in the horizontal direction) as described above, and the change in color balance can thereby be suppressed.

When the sensitivity is changed for all pixels or by a predetermined pixel region unit and when the pulse period is reviewed halfway, it is preferable that the pulse period is changed so that the highest count value at timing K of the photon counter 403 reaches the first threshold Cx. The pulse period may be changed based on the average value or the histogram of the count values of the photon counter 403 of the plurality of pixels.

Using the highest count value is preferable because pixel signals from all pixels can be restored. In contrast, if the histogram is used, the count value of the damaged pixels that deviate from the histogram can be eliminated, resulting in improving the signal-to-noise ratio of the image.

The determination circuit 405 stops the time counter 404 when the count value of the photon counter 403 connected to the time counter 404 does not reach the first threshold Cx even when the count value of the time counter 404 reaches the predetermined second threshold.

Subsequently, the measured value of the photon counter 403 at that time point is output. Such a configuration can avoid a reduction in the frame rate when the brightness of the object is very dark. The predetermined second threshold is preferably set to the maximum value K of the time count.

Figure 8:
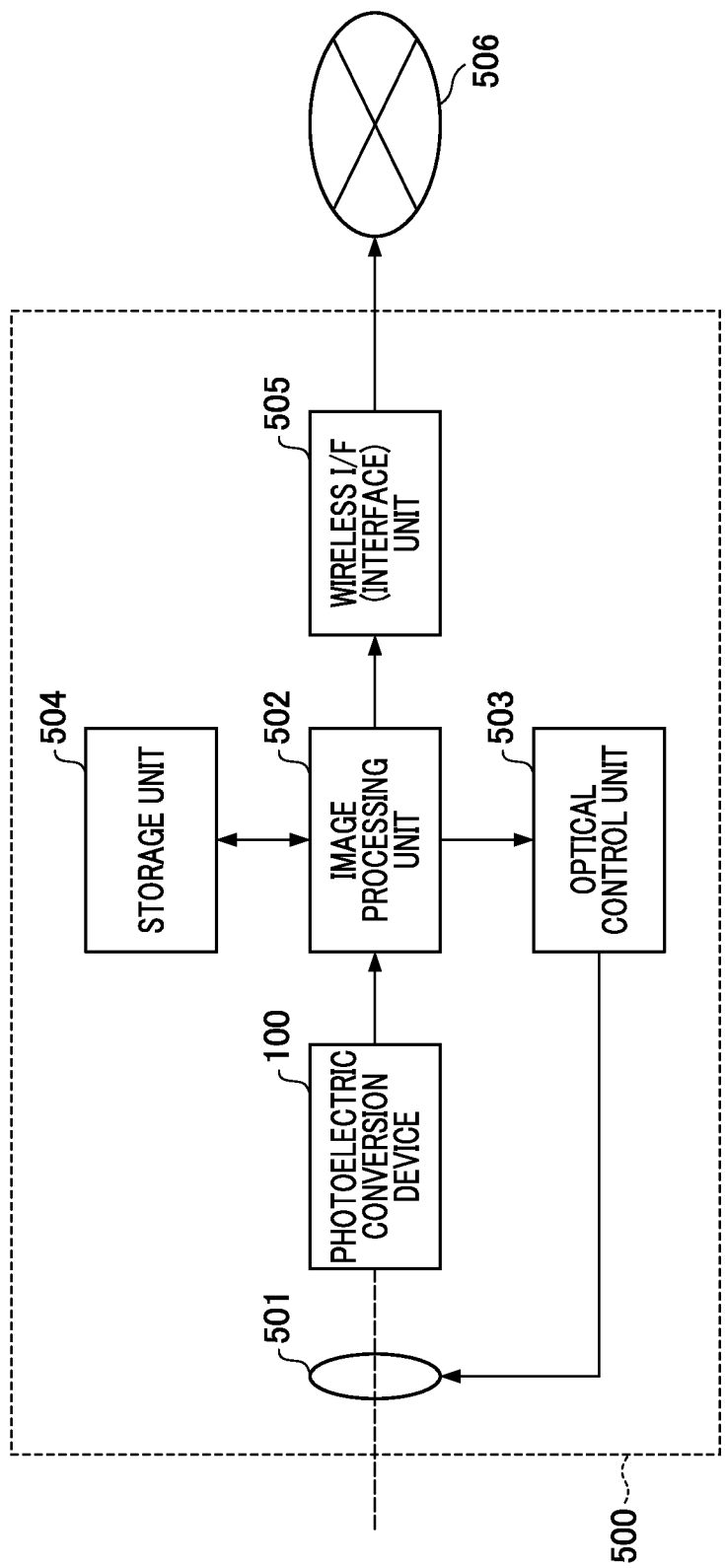
FIG. 8 is a block diagram showing an image pickup apparatus 500 that uses a photoelectric conversion device 100 according to the first embodiment or the second embodiment.

FIG. 8 is a block diagram of an image pickup apparatus 500 that uses the photoelectric conversion device 100 in the first embodiment or the second embodiment.

The image pickup apparatus 500 is, for example, a digital camera and includes the photoelectric conversion device 100, a lens 501, an image processing unit 502, an optical control unit 503, a storage unit 504, and a wireless I/F (Interface) unit 505 serving as a network communication unit.

The lens 501 includes a focus lens, a zoom lens, a diaphragm, and the like, forms an optical image of an object, and makes the formed optical image incident to the image pickup surface of the photoelectric conversion device 100.

In the photoelectric conversion device 100, an optical image formed by the lens 501 is captured. In the image processing unit 502, processing such as signal rearrangement, correction of defective pixels, noise reduction, color conversion, white balance correction, gamma correction, and data compression are performed on the signals that have been read out from the pixel region 12 of the photoelectric conversion device 100, and image signals are generated.

A CPU serving as a computer is incorporated in the image processing unit 502 and functions as a control unit that controls the operation of each unit of the entire image pickup apparatus 500 based on a computer program being stored in a memory serving as a storage medium.

Additionally, the image processing unit 502 causes the pulse generating circuit 407 to perform control for changing the sensitivity of the pixel 201 during the time until the measured value of the photon counter 403 reaches the first threshold Cx after the photon counter 403 starts the measurement.

The optical control unit 503 performs control for a focus lens, a zoom lens, a diaphragm, and the like provided in the lens 501.

The storage unit 504 includes, for example, a recording media such as a memory card and a hard disk. The wireless I/F (Interface) unit 505 serving as a communication unit, transmits, for example, an image signal generated by the image processing unit 502 to the outside of the image pickup apparatus 500 and receives signals from the outside thereof via a network 506.

The I/F unit 505 may be, for example, a plurality of routers, switches, cables, and the like that meet a communication standard such as Ethernet (registered trademark), and the client can control the image pickup apparatus 500 via the network 506.

Although, in the above-described embodiments, the first threshold (threshold of the number of photons) Cx of the photon counter 403 is fixed, for example, a first threshold changing unit that changes the first threshold Cx based on the environmental information, the object information, and the like may be provided.

In the environmental information, if, for example, a detection unit that detects a temperature and a battery voltage is provided and the temperature is higher than a predetermined temperature and the battery voltage is lower than a predetermined voltage, the first threshold Cx may be set low.

The object information includes any one of whether or not the object region, whether or not the object is in focus with a predetermined threshold or higher, and whether or not the object has a relatively high contrast, and if the conditions thereof are met, the first threshold Cx may be set lower. Such control results in optimization of power consumption.

Further, it may be possible to combine the operation of temporally changing the pixel sensitivity as in the first and second embodiments with the operation of changing the first threshold (threshold of the number of photons) Cx according to the environmental information, the object information, and the like as described above. Thus, the tone and power consumption in the image pickup apparatus 500 can be further optimized.

As described above, as the time T required for the number of photons to reach the first threshold Cx is shorter, the tone becomes more coarse. In the case in which the number of photons incident to the photoelectric conversion element is fixed, T becomes shorter as Cx is smaller.

Therefore, when the first threshold Cx is higher than a third threshold, the temporal change in the pixel sensitivity may not be performed, and when the first threshold Cx is lower than the third threshold, the temporal change in the pixel sensitivity may be performed. As the first threshold Cx is smaller, the frequency of the temporal change in the pixel sensitivity may be increased.

Additionally, since an object region of interest requires more tone information, a configuration in which the temporal change in the pixel sensitivity is performed in the object region, without performing the temporal change in the pixel sensitivity in the regions other than the object region, may be employed. The frequency of the temporal change in the pixel sensitivity may be changed depending on whether or not the region is the object region.

In the embodiments, an example applied to the digital camera serving as the image pickup apparatus has been described. However, the image pickup apparatus includes electronic equipment having an image pickup function, such as a digital movie camera, a smartphone with a camera, a tablet computer with a camera, an on-vehicle camera, a drone camera, a camera mounted on a robot, and a network camera.

Additionally, each unit in the above embodiments may include a discrete electronic circuit, or may be partially or entirely configured by a processor and computer program such as an FPGA or CPU.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the photoelectric conversion device or image pickup apparatus through a network or various storage media. Then, a computer (or a CPU, an MPU, or the like) of the photoelectric conversion device or image pickup apparatus may be configured to read and execute the program. In such a case, the program and the storage medium storing the program configure the present invention.

This application claims the benefit of Japanese Patent Application No. 2021-138338 filed on Aug. 26, 2021, which is hereby incorporated by reference herein in its entirety.

What is claimed is:

1. A photoelectric conversion device comprising:
   at least one pixel including a photoelectric conversion element that outputs a signal according to an incident photon;
   a photon counter that outputs a measured value according to the number of photons incident to the pixel; and
   a time counter that measures a time until the measured value of the photon counter reaches a first threshold after the photon counter starts the measurement; and
   at least one processor or circuit configured to function as:
   a sensitivity adjustment unit configured to perform a sensitivity change for the pixel during a time until the measured value of the photon counter reaches the first threshold after the photon counter starts the measurement.

2. The photoelectric conversion device according to claim 1, wherein the photoelectric conversion element includes an avalanche photodiode.

3. The photoelectric conversion device according to claim 1, wherein the sensitivity adjustment unit performs the sensitivity change at least once during a time until the measured value of the photon counter reaches the first threshold after the photon counter starts the measurement.

4. The photoelectric conversion device according to claim 1, wherein the sensitivity change includes a change for increasing the sensitivity of the pixel.

5. The photoelectric conversion device according to claim 1, wherein the sensitivity adjustment unit includes a pulse generating circuit configured to change a pulse period for switching a bias potential of the photoelectric conversion element.

6. The photoelectric conversion device according to claim 5, wherein the pulse generating circuit shortens the pulse period during a time until the measured value of the photon counter reaches the first threshold after the photon counter starts the measurement.

7. The photoelectric conversion device according to claim 1, further comprising at least one processor or circuit configured to function as:
   a signal restoring unit configured to restore a time measured by the time counter as an output signal of the pixel.

8. The photoelectric conversion device according to claim 1, wherein if the measured value of the photon counter does not reach the first threshold even if the time measured by the time counter reaches a second threshold, the measured value of the photon counter is output.

9. The photoelectric conversion device according to claim 1, wherein the sensitivity adjustment unit changes the sensitivity of the pixel after a first timing according to the measured value of the photon counter at the first timing.

10. The photoelectric conversion device according to claim 9, wherein the sensitivity adjustment unit changes the sensitivity of the pixel after the first timing such that the measured value of the photon counter reaches the first threshold when a time measured by the time counter reaches a second threshold.

11. The photoelectric conversion device according to claim 1, wherein the sensitivity adjustment unit changes the sensitivity of the pixel for each predetermined pixel region in which the plurality of pixels is included.

12. The photoelectric conversion device according to claim 1 further comprising at least one processor or circuit configured to function as:
   a first threshold changing unit configured to change the first threshold.

13. An image pickup apparatus comprising:
   a pixel including a photoelectric conversion element that outputs a signal according to an incident photon;
   a photon counter that outputs a measured value according to the number of photons incident to the pixel; and a time counter that measures a time until the measured value of the photon counter reaches a first threshold after the photon counter starts the measurement; and at least one processor or circuit configured to function as:

a sensitivity adjustment unit configured to perform a sensitivity change for the pixel during a time until the measured value of the photon counter reaches the first threshold after the photon counter starts the measurement; and a control unit configured to cause the sensitivity adjustment unit to perform the sensitivity change for the pixel.

14. A control method for controlling a photoelectric conversion device having a pixel including a photoelectric conversion element that outputs a signal according to an incident photon, a photon counter that outputs a measured value according to the number of photons incident to the pixel, a time counter that measures a time until the measured value of the photon counter reaches a first threshold after the photon counter starts the measurement; and at least one processor or circuit configured to function as:

a sensitivity adjustment unit configured to perform a sensitivity change for the pixel, the control method comprising:

a sensitivity adjustment step of changing the sensitivity of the pixel by the sensitivity adjustment unit until the measurement value of the photon counter reaches the first threshold after the photon counter starts the measurement.

15. A non-transitory computer-readable storage medium configured to store a computer program to control a photoelectric conversion device configured to have a pixel including a photoelectric conversion element that outputs a signal according to an incident photon, a photon counter that outputs a measured value according to the number of photons incident to the pixel, a time counter that measures a time until the measured value of the photon counter reaches a first threshold after the photon counter starts the measurement, and at least one processor or circuit configured to function as:

a sensitivity adjustment unit for performing a sensitivity change for the pixel, wherein the computer program comprises instructions for executing following process:

a sensitivity adjustment step of changing the sensitivity of the pixel by the sensitivity adjustment unit until the measurement value of the photon counter reaches the first threshold after the photon counter starts the measurement.

* * * * *